SINGLE GUN COMPATIBLE COLOR REPRODUCTION TUBE

Filed July 26, 1963 2 Sheets-Sheet 1

INVENTOR.
R. LEE HOLLINGSWORTH
BY
Albert L. Jacobs
ATTORNEY

INVENTOR.
R. LEE HOLLINGSWORTH
BY Albert Jacobs
ATTORNEY

United States Patent Office 3,262,007
Patented July 19, 1966

3,262,007
SINGLE GUN COMPATIBLE COLOR REPRODUCTION TUBE
R. Lee Hollingsworth, 266 Maple Place, Mineola, N.Y.
Filed July 26, 1963, Ser. No. 297,814
24 Claims. (Cl. 315—14)

The present invention relates to cathode ray means for reproduction of television in natural colors, or in black and white. The invention is fully compatible, in that it will reproduce in black and white, or in multi-colors, pictures in motion when controlled in accordance with the mode of television transmission. The present application is a continuation-in-part of applicant's application Serial No. 777,721, filed on December 2, 1958, now abandoned.

This multi-color system of television reproduction utilizes only one electron gun, or one electron beam, in a cathode ray tube for reproduction of images in motion, therefore complications are overcome in the manufacture, assembly, adjustments for correct operation, and in field servicing of color television receivers.

A chief feature of the present invention resides in the method of construction and assembly of the various materials and parts that are used in the construction of the invention, to produce new and novel means for color television reproduction, and of new effects in television reproduction in black and white.

One embodiment of the invention comprises the arrangement of colored glass, or suitable transparency, covering metallic plated and phosphorized parallel grooves arranged to comprise raster control elements extending vertically across the viewing end of the cathode ray tube, and disposed parallel to each other horizontally across the tube. Phosphors are deposited over the entire area of the grooves, and with the total metal plating, they are then divided at the crests of the grooves, leaving the grooves electrically insulated from each other by vacuum space. The color grooves not instantly active are rendered more negative in potential than the grooves instantly impinged by the beam of electrons. This voltage switching within the grooves is in synchronism with the color scanning of the television camera supplying the synchronizing signals.

One object of the present invention is to reproduce television images in multi-colors, whereby in one embodiment, the color transforming medium remains, in part, perfect during the entire life of the tube, only the light intensity thereof diminishing with the tube's aging process.

Another object of the invention is to provide a system of color television reproduction that is compatible for both black and white, and for multi-color television reproduction.

Another object of the invention is to provide a rear viewing, exceedingly bright, low accelerating voltage cathode ray tube, for both black and white and multi-color television reproduction.

Another object of the invention is to provide a television reproducing cathode ray tube having a single beam, and means for controlling the single beam to impinge on color phosphor areas in synchronous relationship to the color scanning of the television camera.

An important feature of the present invention resides in the construction, the arrangement of the materials relative to each other, precision of grooved plates, in order to produce a new, novel and useful means for transmission and reproduction of color television signals, and the reproduction of color television signals in black and white.

One embodiment of the invention comprises the arrangement of glass in colored strip sections, or other suitable transparencies with many fine holes therein. This masking means may cover metallically coated parallel grooves which are phosphorized and arranged to comprise raster control elements within the entire groove from crest to crest, extending vertically across the viewing end of the cathode ray tube. The grooves that are not instantly active are rendered negative or less positive with respect to the cathode, producing the electron beam in synchronism with the color scanning of the television camera. The control raster elements comprising the metallized transparent grooved areas are preferably controlled by the action of a cathode ray beam switching device in both the television camera and in the television receiver under the control of a tone signal transmitted to the camera and receivers. In this embodiment of the invention, the phosphor may be a single color and controlled to produce white light, as example, through the colored porous transparencies fitted over the grooves on a viewing plate according to the camera color synchronizing signals.

Another embodiment of the invention comprises the grooves within the glass viewing plate that are treated to be electrically conductive but transparent for frontal viewing, with the phosphors deposited in the grooves from crest to crest and controlled by the control signals connected with the conductive groove, the crests of said grooves being removed to separate the grooves into individual phosphor lines and control elements that are connected in three groups representative of the three colors that are at the instant made selectively sensitive by color synchronizing signals.

Another embodiment of the invention comprises parallel grooves across a viewing plate of a television tube that are plated to be reflective and the tube's picture is viewable from the beam side of the tube.

Another embodiment of the invention comprises a glass plate having a plurality of fine holes of uniform character and plated on the side opposite that of the beam to allow beam electrons to pass, and be accelerated through the holes to the phosphor, by a voltage connected to the plated area and to the cathode, and by a transparent conductive plate on which the phosphor is mounted. When the electrons strike the phosphor and produce light, the plated glass plate, through which the electron beam passes to reach the phosphor, acts as a light reflector, increasing the brightness of the tube's images. The grooves may be coated with color producing phosphor or with only white light producing phosphor, to produce black and white television pictures. If the color filter strips cover the grooves, the holes therein are preferably etched or prepared through the filter at an angle to receive the electrons, but viewing is by or along another angle to exclude the white light from view.

Another embodiment of the invention comprises a control grid as the only color control means positioned frontally of each groove.

Another embodiment of the invention comprises a control grid means positioned frontally of each groove and connected to be controlled co-incidentally with the metal plated or metal coated grooves, giving a more positive control of the electron beam by the simultaneous control of the grid in front of the phosphor and the metallized groove on the opposite side of the phosphor according to color code synchronizing signals.

Another embodiment of the invention is to provide a television tube having a grooved viewing plate, wherein phosphors are deposited over the grooves, and the crests of the grooves are milled off to separate the phosphor into accurate phosphor strips.

Another embodiment of the invention provides a television tube capable of reproducing television images, wherein the grooved viewing plate is first metallized or plated. The phosphor is then deposited in the grooves, and the tops of the grooves are removed to divide the phosphor and the metal into individual strips with control voltage connections attached to the metallized grooves for color control purposes.

Another embodiment of the invention provides a color television reproducing cathode ray tube having a grooved viewing plate in which the phosphors are deposited as to color alternately in the grooves from crest to crest, and a control grid is positioned frontally of each groove for color control switching of the beam.

Another embodiment of the invention provides a color television reproducing cathode ray tube having a grooved viewing plate in which the grooves are metallically coated or plated, with color producing phosphors deposited within the grooves alternately across the plate, with connections from each groove to a respective common connector at the end of the grooves where the connections are made to each groove. Molten solder is poured into the grooves while the plate is tilted to solder the connections to the grooves. The plate is then passed through a precision grinding machine to remove the crests of the grooves and to remove the crests and excess solder over the connections, providing a color viewing plate wherein precision grinding is used to establish the precision character of the plate. This method of viewing plate making is a major accomplishment according to the concept of the invention. This technique and method of plating grooves and grinding the crests to provide accurately closely arranged electric conductors, or resistive conductors, comprises an important part of the present invention, and provides ways and means for close associated circuitry in electric and electronic usages.

Another embodiment of the invention provides bright television pictures by accelerating voltages arranged beyond the phosphor with a porous mirrored reflector forming a halftone pattern on the screen as the beam passes through a hole pattern in the reflector, to strike the phosphor an instant later.

Other purposes and uses apparent in the general field of visual communication and visual display applications, are obvious and set forth in the description of the invention.

The preliminary description of the invention follows reference being made to the drawings wherein, FIGURE 1 shows a cathode ray tube viewing plate for compatible color television reproduction showing constructural details of the viewing plate.

Figure 5:
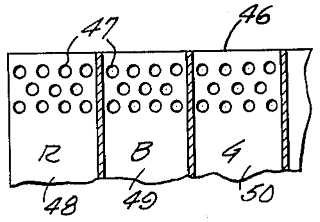

FIGURE 5 is illustrative of a plate or mask having a desired thickness with holes therethrough, which pass the electron beam through these holes to strike the phosphor in predetermined areas. The mask is preferably plated to increase the light intensity of the tube. This plating on the side adjoining the phosphor covers the areas all around the holes.

Figure 5A:
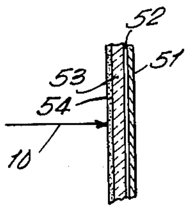

FIGURE 5*a* is a side view of the plate.

Figure 6:
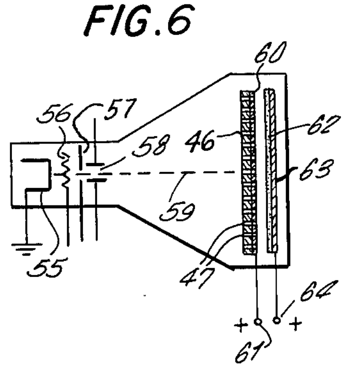

FIGURE 6 shows a side view of a cathode ray tube having the plate of FIGURE 5 mounted therein.

Figure 7:
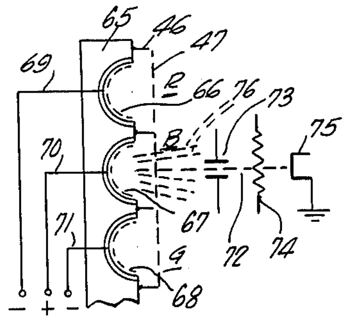

FIGURE 7 shows an embodiment of the invention whereby a mask having a multiplicity of small holes therein, passes beam electrons and passes image light variations in color back through the respective holes of the mask.

Figure 8:
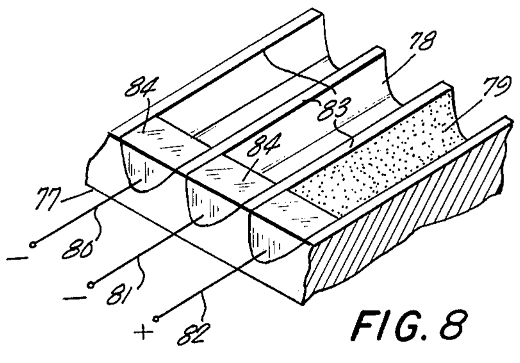

FIGURE 8 illustrates a portion of the finished viewing plate according to the invention showing the manner in which the control leads are soldered to the metallized grooves and milled off to form accurate connections at the same time that the crests of the grooves are milled.

Figure 1:
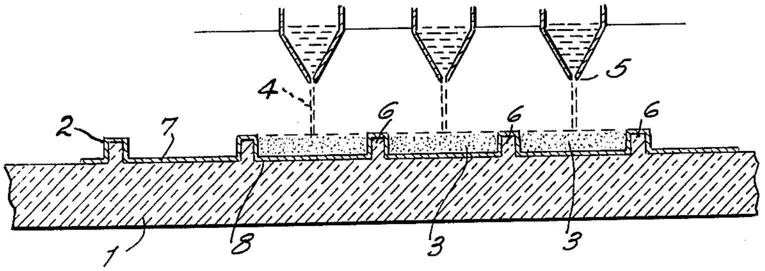
Figure 4:
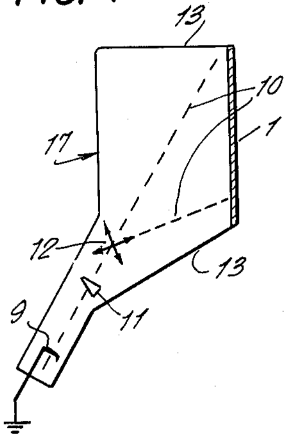
FIGURE 4 shows the tube constructed preferably for rear viewing according to the invention.

A detailed description of the invention follows, reference being first made to FIGURE 1 which shows a portion of a color television viewing plate, or face plate, which is illustrative of the manner in which the plate is made to be mounted within the cathode ray tube. Numeral 1 indicates a small section of the plate, which is molded or pre-cast, having protrusions 2 thereon to form grooves 3. These grooves 3 are first totally plated with a metallic plating, such that in one embodiment of the invention, the grooves have high reflective characteristics, when the tube is viewed from the beam side. The plating may also be so thin as to be readily conductive of low currents yet be fully transparent. Such a metal coating in one form is known as the Corning "ER" process. The next step in constructing the plates comprises the depositing of color producing phosphors 4 into the grooves 3, from the phosphor depositing means 5 as the plates are moved in operative relation to the red, blue and green phosphor depositing constricted flow means 5. The method of depositing the phosphor in the grooves may be accomplished by controlled pressure means, or brushing means of common usage (not shown) adjusted to position and size to brush in the grooves. Application of the phosphors 4 to the grooves 3 may be affected by printing means and techniques known and practiced in the graphic arts fields, that is capable of depositing the correct amount of color phosphors into each groove. In this embodiment of the invention the usual treatment, known in the cathode ray tube art, is given the plate before the plating and phosphors are applied to enable both the plating and the phosphor to adhere. After the phosphor is deposited in grooves 3, the tops of the protrusions 6 are milled, precision ground and polished down to substantially the level of the phosphor. The protrusions serve two distinct functions, the first being to form the grooves to hold and concentrate the phosphor solution or phosphor paste within the grooves, and second, to provide a definite separation between the grooves containing the phosphors when the protrusions are ground down. The protrustions' plated or mirrored sides 8, prevent, to a degree, color mixing near the edges of the phosphor lines, when a cathode ray beam impinges the phosphors to generate light according to the power of the instant beam impingement. The metallic plating or deposit within the grooves is utilized as control electrodes, wherein the instantly impinged groove has an accelerating voltage applied, or a color switching signal voltage applied to the groove platings. The control electrodes, or raster control elements comprising the platings in the adjacent grooves may be negative to provide definite beam impingement within the instantly positive potential energized and impinged groove. The method of color control or color direction, takes place according to the control signals of the color television transmission in known manner. The pictures are then viewed from the beam side of the tube as shown in FIGURE 4, or from the front of the tube if the groove conductive plating is transparent. The values of the control voltages supplied to the plated groove rasters are selected for the best working values to produce the clearest and highest definition in the pictures being received, assuming the focusing of the beam is correct. Viewing plate 1 is fitted into a tube housing according to the usual mechanical aspects of tube manufacturing and the usual baking and sealing processes performed to complete the tube. The color control may be achieved by grid control raster means as explained in FIGURE 2. Plating 7 may, however, be deposited in grooves 3 sufficiently thin as not to retard or reflect light, yet to be capable of conducting beam current, including the increased current due to accelerating voltage connected thereto to serve as both electron acceleration and color control switching by either adding or subtracting the color control voltage selectively according to the mode of transmission and according to the time division relationship of the applied color control system used. Utilization of the transparent metallized plate is not new in the art as such. However, the method of starting with the molded or pre-cast face plate, or viewing plate having the grooves thereon; coating the entire plate with a transparent metallic coating; depositing the color phosphors into the proper grooves; attaching control raster leads thereto by flow solder; precision grinding the crests of the grooves to substantially the level of the phosphor to separate the phosphors into the separate grooves, and to form full groove area control electrodes, comprises a new and novel method of producing color tube viewing plates not known or shown, or anticipated in the prior art. The present invention has the entire groove metal plated and coated with phosphor but individually separated at the summit or crests between the grooves 3. This method of making the plate, having the grooves fully active and operable from crest to crest, comprises a very important part of the invention, for a picture comparable to the standards and quality of the graphic art fields is produced.

Figure 2:
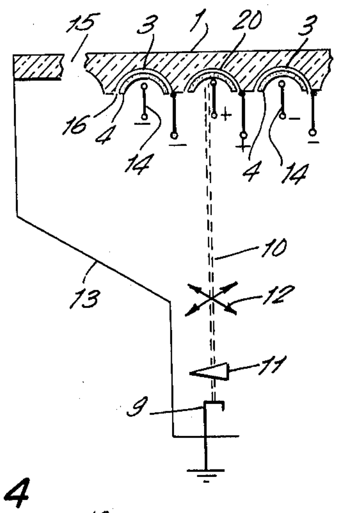
FIGURE 2 represents the basic elements of a cathode ray tube showing an electron beam controlled to impinge upon the viewing plate within the tube.
Figure 3:
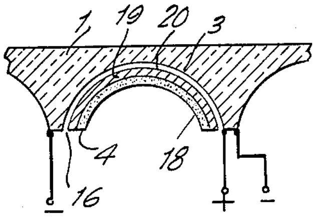
FIGURE 3 shows additional details of a portion of the viewing plate, such as in FIGURE 2.

Reference is now made to FIGURES 2, 3 and 4. A cathode 9, which is normally grounded as shown, produces a beam of electrons 10. The beam of electrons is controlled in the size and quantity of electrons by control means 11, which represents the focusing and grid control means of the tube. The beam of electrons is capable of being controlled laterally at the location of the crossed arrows 12 representative of beam deflection control means by electrostatic and/or electromagnetic forces. The envelope or housing of the tube is represented at 13. A small section of the viewing plate is shown at 1, which is preferably separately mounted within the tube, or is fabricated into the envelope or housing 13. The break in the plate 1 at 15 serves to show that only a portion of the grooves are shown. The plate 1 in FIGURES 2 and 3 is shown to have adjacent, parallelly arranged, substantially concave grooves 3. In FIGURE 2, the grooves 3 are metallically coated as indicated at 20 to be transparent, and one is connected to a positive color control voltage, while the two adjacent metallic coated grooves are connected to negative color control voltages, both the positive and negative voltages being commonly connected to the cathode return circuit in usual fashion according to the art, namely connected to a ground which extends back to cathode 9. It is intended that the beam 10 be maximum in current efficiency in the production of light from the phosphors, as the beam first strikes the edge of phosphors 4, and stays at maximum efficiency as it traverses the groove until it reaches the other side of the phosphor groove area. The positive voltage connected to the instantly impinged groove, with the adjacent plated grooves being negative in potential makes this condition possible and avoids color fringing because the beam current cannot reach the phosphors in the adjacent grooves because of the fully plated area of the grooves, which includes the metal edges that extend to the tops of the grooves. The control grid elements 14, like the metallic coating 20 of grooves 3, in one manner of utilizing the invention, are grouped into three separate raster elements so that during each horizontal beam sweep, a line of color dots of the same color are displayed in a line across the tube. Each horizontal line produces a different line of color dots, the size of the dots depending on the instant amplitude value of the video modulation applied to the beam control element means 11. Conversely, in another manner of utilizing the invention, metallic coated grooves may have a steady accelerating voltage applied commonly and the color switching voltages may be applied selectively only to the grid elements according to the color switching time divisions. A break in the face plate is shown at 15 to indicate that the three grooves illustrated represent only a small enlarged part of the total number of grooves, which may be as many as 600 or more. Color tubes utilizing this method of beam current acceleration and control to and through the phosphor can be built to considerable size or dimension without the corresponding values of high accelerating voltages as commonly used in larger tubes. When made as large as practicable, the viewing plate grooves can be molded or cast, plated, phosphor coated, and the control harness leads connected by flow soldering, and the grooves precision ground to remove the crests and excess solder, with ease and accuracy, when plates are as large as possible. Assuming 650 lines within the thirty inches available in a thirty inch tube, the grooves would be twenty-one to the inch, which would provide ample room for fabrication, plating, phosphorizing and precision milling of the crests. The picture would contain 525 horizontal lines, with 650 dots across the tube within three successive horizontal spaced apart dot lines. Refinements in manufacturing should provide for at least a 17-inch color tube according to the present invention.

Another feature of the present invention is shown in FIGURE 3, wherein the metal plating 20 of the grooves 3, is transparent to light and the concave colored transparency 19 fits firmly against the metal coating 20 by cement or other means of attachment. The phosphor coating 4 is applied to the transparency after which an aluminized coating 18 is preferably applied to the phosphor coating 4 to increase the forward light intensity. Here the color transforming transparency remains constant in color effect with aging and use, as the phosphor gradually loses light producing ability. The phosphors applied to color transparencies 19 may receive only white light permitting the color of the transparencies to convert the white light to its respective colors as it shines through the colored transparencies in the grooves of the plate. The transparencies are dispersed across the face plate in the grooves in order of red, blue and green, and the printing or depositing of the color producing phosphors match the color sequence, namely, the red color producing phosphor is placed in the red transparencies across the plate, and follow as to blue and green light producing phosphors in their respective grooves. Here the color is enhanced in that the colors are presented with deeper and richer color values made possible by this use of the color phosphor in the corresponding transparent colored grooves. Space 16 in FIGURES 2 and 3 is to facilitate illustration. Fabricating the plate of FIGURE 3 is somewhat more difficult and is obviously more expensive. However, these transparent grooves comprising strips of red, blue and green transparent material to fit into each groove may be formed as a single plate to lie fully in their respective grooves, thus the cost of manufacture would be somewhat reduced. The plate itself may be comprised of alternate concave grooved strips formed and fitted together according to their color transparency in which case the color filter groove inserts 19 would not be required.

In FIGURE 4, 17 indicates by the arrow, the viewing direction from the tube when it is intended that the plating 20 of grooves 3 of FIGURE 2 be not transparent to light from the phosphor, but capable of reflecting all light that strikes the plating 20 back through the phosphors to increase the brightness of the tube in the viewing area. Here the mirror is not penetrated by the electrons of the cathode ray beam. The elements and parts of FIGURE 4 have heretofore been described. It is a cogent part of this embodiment of the invention to have grooves conductive, yet transparent, to provide for both a front and rear viewing tube while maintaining the fine line constructional features of the face plate of the tube.

FIGURE 5 is illustrative of a novel type of mask for certain uses in cathode ray tubes according to the present invention. This mask is a means to cover the grooves of the viewing plates described in FIGURES 1–3. The mask may be made of any desired material capable of supporting itself close to or upon the viewing plate to cover the grooves. Small holes 47 are formed in great quantity to allow electrons to pass freely through the holes to strike the phosphor. When the plate 46 is mirrored on the side nearest the phosphor, leaving the holes open to pass electrons freely, the mirrored area is connected to an accelerating voltage to speed the electrons of the beam through the holes to strike the phosphor. The light that is produced is amplified by the reflecting surface around the holes. Here the electrons do not have to penetrate a mirrored surface according to the prior art, and therefore, less voltage is required to operate the tube. Furthermore, the tube image may be half-toned to give improved effects, particularly in black and white television reproduction. The red strip 48, the blue strip 49 and the green strip 50 represent about 600 small transparent strips with fine etched holes 47 therein that are formed as one plate, or which are cemented together or otherwise attached together to form a plate with transparent primary colored strips that fit accurately over the grooves of FIGURES 2 and 3 hereof to match the color producing phosphors in the grooves. The plate may also be used to mask phosphorized lines on plates according to the prior art in this field. The colors comprising the filter strips may be printed on thin glass and covered with another piece of thin glass for protection, comprising another method of making this mask, with or without the holes and plating heretofore recited. The holes 47 may all be etched, or made at an angle such that the electrons may enter and pass through the plate 46 at an angle different from the angle of the reflected light from the phosphor. For example, the beam would flow through the holes, strike the red light producing phosphor, or phosphor to produce a white light, and the light then shines through the red filter strip. The difference here from the prior art is that the beam passes through the holes in the color filters placed adjacent to each other to generate light beyond, which shines forward, or back through the filter depending on the actual position of the phosphor relative to the color filter as in FIGURE 3.

A side view of such a plate is shown in FIGURE 5*a* where one thin plate 51, shown in side view as red, blue and green parallel grooves arranged with printed lines 52, which are covered and protected by glass plate 53. These plates may or may not have the multiplicity of small holes therein depending on the use. This method of making viewing plates therefore forms a basic means for producing a color producing mask for television reproduction. When the printing material used in making the filter strips is conductive of electricity, the printed strips are used for color switching electrodes by connecting the color control voltages to the respective printed color strips as shown in FIGURES 2 and 3. Naturally a smooth coating of white light producing phosphor may be applied to plate 53 as shown by 54, to be struck selectively by beam 10 to produce light that passes through the respective printed transparent colors. The printing of the color on one plate and protecting the printing with the second plate appears to be a new and novel way of constructing viewing plates for use in reproducing color signals using only white light producing phosphor. Plate 53, which supports the phosphor may be a plastic composition that is highly conductive of electric charges from the conductive printed color strips to convey the color control signal charges directly to the phosphor to cause the phosphor to be selectively impinged according to the color synchronizing signals. An added degree of electric insulation is thus provided between the phosphor and the conductive color filter strips.

FIGURE 6 illustrates in a side view, a cathode ray tube wherein the masking means of FIGURE 5 is utilized. The cathode is shown at 55 and the control grid is indicated at 56; the focusing electrode is shown at 57 and the deflecting plates are shown at 58. The beam is shown at 59. The plate 46 is shown in side view with holes 47 extending therethrough. A mirrored plating 60 is shown on plate 46 through which the holes 47 extend to allow free flow of electrons through to the phosphor 62 that is mounted on conductive but transparent plate 63. The beam electrons are accelerated by the positive potential connected to terminal 61 and to the conductive mirror around and between the holes of plate 46, the mirror being indicated by 60. The electrons are accelerated through the holes 47 and are further accelerated to and through the phosphor 62 by the positive potential applied at 64 that is connected to the conductive but transparent plate 63. It is to be appreciated that the voltage applied at 61 may be very low, or even non-existent so long as the conductive mirror is grounded at terminal 61 to prevent a negative charge buildup to oppose the electrons as they pass through the holes 47. In operation, when the electron beam 59 passes through holes 47, they strike the phosphor 62 to produce light, which is intensified by reflection from the mirrored area 60 around and between the holes 47. It is to be appreciated that the phosphor 62 represents phosphors placed in grooved areas, or where the phosphors are printed on a flat glass plate. It is intended that the width of sections 48, 49 and 50 of FIGURE 5 correspond to the width of the grooves of FIGURES 1, 2, 3 and 7.

In FIGURE 7 the mask 46 shown in end view is similar to those of FIGURES 5 and 5*a*. The grooved plate 65 is mirrored; the colored phosphors 66, 67 and 68 are deposited alternately across the plate within the grooves, and leads 69, 70 and 71 are connected to the mirrored areas as illustrated in FIGURE 7. The plate is then passed through a precision grinder to separate the metallized grooves at the crests and to clear away any excess and overlapping solder used in soldering connections 69, 70 and 71 to the grooves. The electron beam 72 is controlled laterally by deflecting plates 73, and in amplitude by grid 74, as they are projected from grounded cathode 75. The beam passes through the holes 47 of the mask 46 and strikes the phosphor in the groove having a positive potential applied thereto according to color control signals. When light is produced in the grooves, the light is reflected back through the mask 46. If all light is white, the passage of light through the red, blue and green filters may have a slight trace of white light therein, unless the holes are angled through the plate to allow the passage of beam electrons at the angle of the holes, for instance at the angle of the beam in FIGURE 4, but here the reflected light in the viewing area does not show the white light generated behind the colored filter strips of plate 46. In FIGURE 7 the beam is shown striking the phosphor to project light as indicated by light lines 76 that passes through the blue section 49 to provide a viewable color elemental detail of the color picture. If the phopshor is blue under the blue filter, the total blue viewed is somewhat richer in quality. Viewing plate 46 of FIGURE 7 may be constructed like the viewing plate of FIGURE 5*a*, wherein the holes extend through plate elements 51, 52 and 53 like holes 47 of FIGURE 5.

FIGURE 8 shows a perspective and end view of a viewing plate to show the method of fabricating the grooves. The plate 77 begins with grooves 78 being molded or ground in the plate. The grooves are fully plated; the grooves have been treated to take and hold the plating, usually by providing a fine roughened surface. The phosphor 79 is then deposited in the grooves. Color control switching leads 80, 81 and 82 are placed in the end of the grooves which are flushed with solder 84. The plate is then passed through a precision grinder and polisher to remove the crests of the grooves to provide separation areas 83 between the grooves, thus placing individual switching contact means over the full area of the grooves. The solder is also smoothed to the level of the separation areas 83, and clean and neatly attaches the grooved plating to control leads 80, 81 and 82. This aspect of the invention represents a definite method of manufacture, the steps of which may be altered, but such alteration which provides the end result by precision grinding to place the conductive strips in the grooves or in or upon a plate still comprises this method aspect of the invention.

It is to be appreciated that this precision grinding process, when used to convert a plated grooved plate to a multi-conductor strip, is considered a part of the present invention, particularly when connecting leads are first soldered to the ends of the grooves and which are separated by the grinding operation that separates the grooves into separate electric conductors.

In carrying the invention into practice, the methods of fabrication and of assembly are the chief features. The method of controlling the electron beam with the grid rasters and the rasters comprised of the plated grooves, either or both of said rasters being controlled singly or both simultaneously in proper voltage control amounts, and placing the phosphor between two control elements, improves the color control and definition of the color reproduced elemental parts of the pictures. It is anticipated that the type of color tube as described in FIGURES 1, 2, 3, 6 and 7 can be mass produced in quantity to vastly reduce the cost and overall effectiveness of color television sets and to improve the performance of color television as it is presently known and practiced.

It is to be appreciated that when any of the viewing plates of FIGURES 1 and 2, or of a smooth viewing plate, is at least in part conductive and reflective of light when coated with phosphor and impinged with an electron beam the light produced to the rear is the sum total of the first light produced by the beam impingement, plus the light reflected from the mirrored portion of the plate through the phosphor. When a reflective viewing plate is electrically conductive, a beam accelerating voltage may be connected to the plate to provide a bright daylight tube with considerably reduced accelerating voltage, since the accelerating voltage is applied to attract beam electrons through the phosphor. FIGURE 8, without plate 36 and holes and plating 60, is indicative of such a plate.

It is to be understood that the plates described may be made of semi-conductive material having a resistance value as desired, or be made of plastic material, laminated or in plain sheet material which has the ability of conducting applied electrostatic charges selectively to the area of instant beam impingement to affect the control of the said impingement.

All electrically conductive viewing plates of the present invention may also be selectively energized by direct current voltage and/or an integrating alternating current or pulsed voltage as desired, including integrating frequencies of several hundred thousand for smaller tubes and from two to five million cycles per second for larger tubes to produce fine points of beam acceleration at any instant of beam impingement.

Furthermore, glass raster elements, or other forms of transparent solids, when caused to contain a sufficient metallic conductive material, or if they are coated or laminated with thin layers of transparent metal, such as to cause the colored transparencies to become conductive on the surface or along the body of the material, then the colored transparencies such as 19 of FIGURE 3 may become their own control rasters as well as light color filters or light converters. Here the control voltage harness connection for controlling the cathode ray beam impingement may attach directly to the conductive transparent raster elements to cause them to be the means for controlling the cathode ray beam in accordance with the color impulses for the receiver.

The foregoing description is illustrative of the invention and not intended as a limitation in making obvious changes and applications in carrying the invention into commercial practice and uses.

What is claimed is:

1. In a television cathode ray tube equipped with an electron gun and a fluorescent screen positioned for impingement by a beam of electrons emanating from said gun; said screen comprising a plate member provided on the surface thereof facing said electron gun with a plurality of discrete parallel grooves of uniform size and shape, each of said grooves having its entire surface area covered by an electrically conductive layer of metal, each of said layers having superposed over its entire surface area a quantity of a phosphor adapted to emit light when impinged upon by said beam of electrons, and an electrical terminal provided in each of said grooves at one end thereof in electrical contact with the respective layer of metal, said terminals being adapted for electrical connection to circuitry so as to be operative in controlling said beam of electrons.

2. In a cathode ray tube according to claim 1; each of said layers of metal being sufficiently dense to reflect light emitted by its respective phosphor.

3. In a cathode ray tube according to claim 1; each of said phosphors having a light-emission characteristic corresponding to a respective one of the colors red, blue and green, and said phosphors being arranged across said plate member in recurring groups of one red, one blue and one green light emitting phosphor.

4. In a cathode ray tube structure according to claim 1, control grid means positioned across the phosphor-bearing surface of said screen, said control grid means comprising a plurality of raster elements each associated with a respective groove and each adapted to control the intensity of the passing electron beam in accordance with color television scanning wave impulses, the adaptation to further control the intensity of the electron beam including signal control voltages applied to said conductive layers of metal in co-incidental control relationship with said raster elements.

5. In a cathode ray tube according to claim 1; each of said layers of metal being sufficiently thin to be transparent to light emitted by its respective phosphor.

6. In a cathode ray tube according to claim 5; each of said grooves further having a thin light-reflective coating of metal on that surface of the respective phosphor which is remote from the associated transparent layer of metal.

7. In a cathode ray tube according to claim 1; said screen further comprising a plurality of colored transparent elements interposed in each of said grooves between the layer of metal thereof and the associated phosphor, each of said elements having a light-transmission characteristic corresponding to a respective one of the colors red, blue and green, and said elements being arranged across said plate member in recurring groups of one red, one blue and one green transmitting element.

8. In a cathode ray tube according to claim 7; the phosphor in each of said grooves having a white light-emission characteristic.

9. In a cathode ray tube according to claim 7; the phosphor in each of said grooves having a light-emission characteristic corresponding to the light-transmission characteristic of the associated one of said elements.

10. In a cathode ray tube according to claim 7; each of said grooves further having a thin light-reflective coating of metal on that surface of the respective phosphor which is remote from the associated transparent element.

11. In a cathode ray tube according to claim 1; control grid means positioned across the phosphor-bearing surface of said screen, said control grid means comprising a plurality of raster elements each associated with a respective groove and each adapted to control the intensity of the passing electron beam in accordance with color television scanning wave impulses.

12. The invention according to claim 11 wherein the control grid means comprise perforated raster elements to selectively pass and reject beam electrons according to applied television color switching control voltages.

13. The invention according to claim 12 wherein each of said raster elements substantially cover each colored light producing area.

14. In a cathode ray tube according to claim 1; a plate-like mask positioned across the phosphor-bearing surface of said screen, said mask being provided with a plurality of holes to facilitate free passage of electrons therethrough.

15. In a cathode ray tube according to claim 14; each of said phosphors having a light-emission characteristic corresponding to a respective one of the colors red, blue and green, and said phosphors being arranged across said plate member in recurring groups of one red, one blue and one green light emitting phosphor, said mask comprising a coherent structure of side by side colored strips each of which is either red or blue or green, and said strips being arranged in recurring groups of one red, one blue and one green strip, the grouping being identical with and precisely mated to the grouping of said phosphors.

16. In a cathode ray tube according to claim 14; said mask being provided over the imperforate portions of that surface thereof which races said screen with a light-reflective metallic coating.

17. In a cathode ray tube according to claim 16; said reflective coating being adapted to be electrically connected to a source of potential for accelerating the electron beam through said mask.

18. In a cathode ray tube according to claim 16; said holes in said mask being oriented at angles differing from the angles of incidence of light from said phosphors onto said reflective coating.

19. A cathode ray tube structure according to claim 16, wherein said reflective coating is adapted to be electrically connected to a source of potential for accelerating beam electrons along a path extending said beam through said holes of said mask to a pre-arranged phosphorized area.

20. In a cathode ray tube structure for the reproduction of television images in color and in black and white rendition, a masking plate having a plurality of holes therethrough, the side of said plate opposite the cathode of said tube being metallically coated and reflective, an accelerating voltage connected to said coated side of said plate to accelerate pre-directed electron beam current through said holes to light activate a phosphorized area beyond said holes, the light produced by the beam electrons striking the phosphor being concentrated by the reflective side of the said masking plate and the said masking plate being out of contact with the said phosphorized area.

21. A structure of claim 20 in combination with a second accelerating electrode means that is transparent to light is positioned beyond said phosphorized area and connected to a source of voltage.

22. The structure of claim 20 wherein the holes within the masking plate are arranged in a half-tone pattern.

23. A television image reproducing tube having a selectively controllable beam of electrons directed and controlled to impinge upon a television viewing plate means, a first imaging plate to provide a viewing area, colored transparent lines deposited on the cathode side of said viewing means, a transparent supporting protective plate to pass beam electrons therethrough fitted against said colored transparent lines, and a phosphor coating applied to the side of said supporting plate nearest the cathode.

24. The invention according to claim 23 wherein the deposited colored lines are conductive of electricity and connectable to color control voltages derived from television transmission signals to selectively control the beam of electrons upon said phosphor coating.

References Cited by the Examiner

UNITED STATES PATENTS

| | | | |
|---|---|---|---|
| 2,254,626 | 9/1941 | Schade | 178—69.5 |
| 2,446,440 | 8/1948 | Swedlund | 313—92 |
| 2,580,672 | 1/1952 | Graham | 178—69.5 |
| 2,605,434 | 7/1952 | Homrighous | 313—92 |
| 2,795,719 | 6/1957 | Morrell | 313—92 X |
| 2,855,542 | 10/1958 | Schade | 313—92 X |
| 2,862,141 | 11/1958 | Kruper et al. | 315—21 |
| 2,867,749 | 1/1959 | Charlton | 315—21 |
| 2,955,348 | 10/1960 | Healy | 29—25.17 |
| 3,013,178 | 12/1961 | Eaton | 315—13 |
| 3,128,531 | 4/1964 | Wilcock | 29—25.17 |

DAVID G. REDINBAUGH, *Primary Examiner.*

J. A. O'BRIEN, J. E. BECK, T. A. GALLAGHER, *Assistant Examiners.*